July 15, 1969     W. E. DANJCZEK     3,455,639
DRAFTING PEN POINT FOR VERTICAL SURFACES
Filed May 23, 1967
Fig. 1.
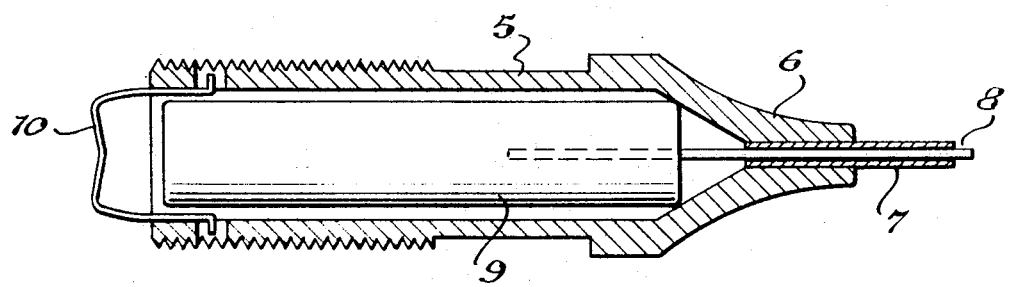
Fig. 2.
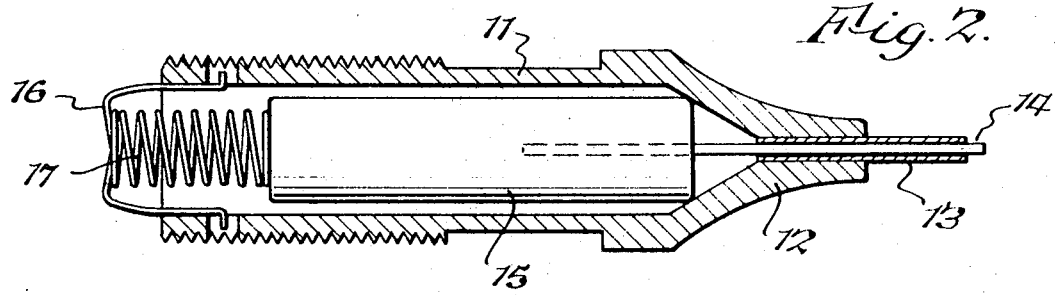
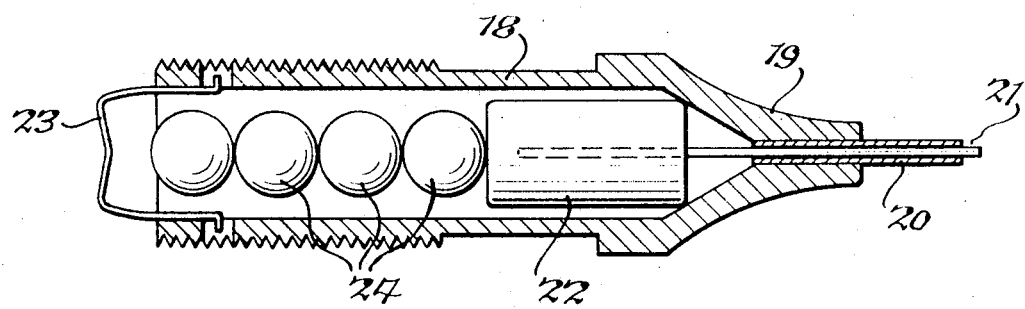
Fig. 3.
INVENTOR.
William E. Danjczek
BY
ATTORNEYS.

United States Patent Office 3,455,639
Patented July 15, 1969

3,455,639
DRAFTING PEN POINT FOR VERTICAL SURFACES
William E. Danjczek, Easton, Pa., assignor to Koh-I-Noor, Inc., Bloomsbury, N.J., a corporation of New Jersey
Filed May 23, 1967, Ser. No. 640,539
Int. Cl. B43k 5/18, 5/16
U.S. Cl. 401—259                      1 Claim

ABSTRACT OF THE DISCLOSURE

This invention is directed to stylus type pen points for use on vertical surfaces in which a flow control wire is reciprocably carried within a tubular nib mounted in a nib adapter and has its inner end connected to an actuating weight. Springs or balls are interposed between the free end of the weight and a retainer at the inner end of the nib adapter to urge the weight and the flow control wire toward the nib and cause the weight to act as an ink pump when the pen is in a substantially horizontal position for writing on a vertical surface as its stylus nib is brought into and out of contact with the vertical surface.

---

This invention relates generally to new and useful improvements in fountain pens and particularly seeks to provide a stylus-type drawing pen having a novel point construction to enable the pen to be used for inking on vertical surfaces.

Stylus type drawing pens, such as those currently marketed under the trademark Rapidograph by Koh-I-Noor, Inc., generally include a tubular stylus point or nib rigidly affixed through the pointed end of a nib adapter which is in turn threadably connected within the pen barrel or within a finger grip element connected to the barrel. An ink flow controlling wire fits freely within the stylus and normally has one end projecting beyond the free end thereof and its other end connected to a cylindrical weight mounted for free reciprocal movement within the nib adapter. In use on horizontal or mildly slanted surfaces, the pen is held in a near-vertical position and the stylus is brought into contact with the surface to be inked causing the flow wire to be pushed back into the stylus and permitting a meniscus of ink to form at the extreme tip for application to the drawing surface. If the flow of ink should be interrupted, a simple vertical shake of the pen will cause the weight to move relative to the nib adapter and restart the flow of ink. Since this standard type of stylus pen depends primarily on the force of gravity to assure a continued flow of ink it cannot be used for inking on vertical surfaces when the pen must be held in a horizontal or near-horizontal position.

However, pens having stylus tip assemblies constructed in accordance with this invention can be used for inking on vertical surfaces.

Therefore, an object of this invention is to provide a novel tip assembly for a stylus-type drawing pen so constructed that the pen is particularly useful for the inking of vertical surfaces.

Another object of this invention is to provide a tip assembly of the character stated that includes a tubular stylus point or nib affixed through the pointed end of a nib adapter and carrying a flow control wire having one end normally projecting slightly beyond the extreme end of the stylus point and its other end connected to a cylindrical weight mounted for reciprocal movement within the nib adapter, there being means provided for biasing the weight and its associated flow wire toward the stylus tip.

Another object of this invention is to provide a tip assembly of the character stated in which the weight is biased by resilient means interposed between the free end thereof and a retainer affixed to an associated portion of the nib adapter.

Another object of this invention is to provide a tip assembly of the character stated in which the resilient biasing means may be either a compression spring or a resilient spongy cushion capable of permitting the passage of ink therethrough as it expands and contracts as the result of reciprocation of the weight in the nib adapter.

A further object of this invention is to provide a tip assembly of the character stated in which the weight is biased in one direction by the weight of a plurality of metal balls interposed between the free end thereof and a retainer affixed to an associated portion of the nib adapter.

A further object of this invention is to provide a tip assembly of the character stated that is simple in design, rugged in construction and economical to manufacture.

With these and other objects, the nature of which will be apparent, the invention will be more fully understood by reference to the drawings, the accompanying detailed description and the appended claim.

In the drawings:

FIG. 1 is a longitudinal section of a typical stylus-type tip assembly of known construction;

FIG. 2 is a longitudinal section of a stylus-type tip assembly constructed in accordance with this invention; and FIG. 3 is a view similar to FIG. 2, but showing a modified form of the invention.

Referring to the drawings in detail, a standard tip assembly for use with pens for inking on horizontal or slightly slanted surfaces is shown in FIG. 1 and includes an externally threaded nib adapter 5 having a pointed end 6 into which a tubular stylus nib or point 7 is affixed. An ink flow control wire 8 fits freely within the stylus 7 and normally has one end projecting slightly beyond the free end thereof and its other end connected to a relatively long cylindrical weight 9 that fits freely within the bore of the adapter 5. A retainer 10 extends across the open end of the adapter and limits the distance the weight 9 can move in one direction while the pointed end 6 of the adapter limits its movement in the opposite direction.

In use the adapter 5 is threaded into the barrel (not shown) of a pen in the usual way and a supply of ink flows from the barrel around the weight 9 and into the bore of the stylus 7 around the wire 8. As the stylus is brought into contact with a drawing surface, the wire 8 is forced back into the stylus thus permitting the ink to form a meniscus at the tip thereof so that the ink will readily and evenly flow onto the drawing surface as the pen is moved therealong. This retraction of the wire obviously will cause a corresponding movement of the weight 9 toward the retainer 10. If at any time the ink flow through the stylus should be interrupted or if the ink should dry out during periods of disuse, the flow can be readily restarted simply by shaking the pen vertically to reciprocate the weight and wire and cause ink to flow around the weight by displacement. Since pens with this type of tip assembly must be held nearly upright in order to function properly they cannot be used for drawing on vertical or near-vertical surfaces.

Referring further to the drawings in detail, the invention as illustrated is embodied in a tip assembly for use with pens for inking on vertical or near-vertical surfaces as well as on horizontal or slanted surfaces is shown in FIG. 2 and includes an exterally threaded nib adapter 11 having a pointed end 12 into which a tubular stylus nib or point 13 is affixed. An ink flow control wire 14 fits freely within the stylus 13 and normally has one end projecting slightly beyond the free end thereof and its other end connected to a relatively long cylindrical weight 15 that fits freely within the bore of the adapter 11. A retainer 16 extends across the open end of the adapter and a compression spring 17 is interposed between the retainer and the adjacent end of the weight 15 to constantly bias the weight and its associated flow control wire 14 toward the stylus 13 so that the free end of the wire is normally maintained in a position projecting slightly beyond the free end of the stylus.

When a pen fitted with the tip assembly of this invention is to be used for drawing to a vertical surface, it must be held in a substantially horizontal position for proper contact between the stylus and the drawing surface, and in that position the force of gravity cannot function to cause ink to flow. Ink flow can be started and maintained simply by bringing the stylus into contact with the drawing surface thus causing the flow control wire 14 and the weight 15 to move back against the resistance of the compression spring 17. This movement of the weight causes it to act like a displacement pump and forces the ink in the adapter to occupy the void created at the front end of the weight and flow into the stylus 13. A similar effect is created each time the pen is lifted from the drawing surface when the compression spring 17 effects a forward movement of the weight and flow control wire.

If desired, the compression spring 17 could be replaced by a resilient cushion (not shown) formed from any suitable foamed material capable of permitting flow of ink therethrough.

A modified form of tip assembly constructed in accordance with this invention is shown in FIG. 3 and includes an externally threaded nib adapter 18 having a pointed end 19 into which tubular stylus nib or point 20 is affixed. An ink flow control wire 21 fits freely within the stylus 20 and normally has one end projecting slightly beyond the free end thereof and its other end connected to a relatively short cylindrical weight 22 that fits freely within the bore of the adapter 18. A retainer 23 extends across the open end of the adapter and a group of metal balls 24, having a diameter approximating that of the weight 22, are interposed between the retainer and the adjacent end of the weight.

When a pen fitted with the modified tip assembly is to be used for drawing on a vertical surface, it must also be held in a substantially horizontal position for proper contact between the stylus and the drawing surface, and in that position the force of gravity cannot function to cause ink to flow.

Ink flow can be started and maintained by a horizontal motion of the pen away from and back to the drawing surface. This back and forth (horizontal) motion causes the balls 24 to roll back and forth within the nib adapter 18. Bringing the stylus nib 20 into contact with the drawing surface causes the flow control wire 21, the weight 22 and the metal balls 24 to move back toward the retainer 23. This movement of the weight 22 causes it to act like a displacement pump and forces the ink in the adapter to occupy the void created at the front end of the weight and flow into the stylus 20. Removing the stylus 20 from the drawing surface causes the balls 24 to roll forward pushing the flow control wire 21 and the weight 22 forward in front of them.

Since pens of this type can be used at a slight angle to the drawing surface, the same effect is obtained when drawing on a vertical surface by holding the pen at a slight upward angle to the drawing surface. Bringing the stylus nib 20 into contact with the drawing surface causes the flow control wire 21, the weight 22 and the metal balls 24 to move back toward the retainer 23, with the same result as previously described. Removing the stylus 20 from the drawing surface causes the balls 24 to roll down the slight decline pushing the flow control wire 21 and the weight 22 forward in front of them. When the drawing surface is at a near vertical position, the pen when at a right angle to the drawing surface is slightly inclined to the horizontal and the same desired action is obtained.

It is of course to be understood that variations in arrangements and proportions of parts may be made within the scope of the appended claim.

I claim:

1. In a tip assembly for stylus-type fountain pens capable of writing on vertical surfaces wherein is provided, a hollow nib adapter having a pointed end, a tubular stylus nib affixed through the pointed end of said nib adapter, a flow control wire fitted freely within said stylus nib and having one end normally projecting beyond the free end thereof and its other end projecting into the interior of said nib adapter, a cylindrical weight fitted freely within said nib adapter and having one end connected to the inner projecting end of said flow control wire, and means for retaining said weight within said nib adapter; the combination of a plurality of freely movable axially aligned solid balls having a diameter substantially equal to that of said cylindrical weight and interposed between said retaining means and the adjacent end of said weight for urging said weight and its connected flow control wire toward said stylus nib whenever said pen is tilted above the horizontal and to permit said weight, its connected flow control wire and said balls to move away from said stylus nib whenever said pen is tilted below the horizontal, thus causing said weight to act as an ink pump.

References Cited

UNITED STATES PATENTS

| 748,383 | 12/1903 | Langill | 401—260 |
| 3,315,644 | 4/1967 | Riepe | 401—259 |
| 3,159,863 | 12/1964 | La Mura | 401—176 |

FOREIGN PATENTS

| 538,909 | 6/1955 | Belgium. |
| 1,237,926 | 3/1967 | Germany. |

LAWRENCE CHARLES, Primary Examiner

U.S. Cl. X.R.

401—260

UNITED STATES PATENT OFFICE
CERTIFICATE OF CORRECTION

Patent No. 3,455,639 July 15, 1969

William E. Danjczek

It is certified that error appears in the above identified patent and that said Letters Patent are hereby corrected as shown below:

In the heading to the printed specification, line 4, "a corporation of New Jersey" should read -- a corporation of New York --.

Signed and sealed this 7th day of July 1970.

(SEAL)
Attest:

Edward M. Fletcher, Jr.
Attesting Officer

WILLIAM E. SCHUYLER, JR.
Commissioner of Patents